US008031464B2

(12) United States Patent
Adkins et al.

(10) Patent No.: US 8,031,464 B2
(45) Date of Patent: Oct. 4, 2011

(54) RUGGEDIZED COMPUTER CAPABLE OF OPERATING IN HIGH-TEMPERATURE ENVIRONMENTS

(75) Inventors: Casey R. Adkins, Hazel Green, AL (US); Charles A. Abare, Athens, AL (US); Andrew J. Ornatowski, Toney, AL (US)

(73) Assignee: Intergraph Technologies Corporation, Las Vegas, NV (US)

( * ) Notice: Subject to any disclaimer, the term of this patent is extended or adjusted under 35 U.S.C. 154(b) by 52 days.

(21) Appl. No.: 12/555,468

(22) Filed: Sep. 8, 2009

(65) Prior Publication Data
US 2010/0061053 A1 Mar. 11, 2010

Related U.S. Application Data

(60) Provisional application No. 61/095,243, filed on Sep. 8, 2008.

(51) Int. Cl.
*H05K 7/20* (2006.01)
(52) U.S. Cl. ............. 361/679.47; 361/679.52; 361/700; 361/704; 361/710; 361/714; 165/80.3; 165/80.4; 165/104.21; 165/104.33; 165/185
(58) Field of Classification Search ............. 361/679.33, 361/679.46–54, 688, 689, 699–702, 707–712, 361/714, 717–724; 165/80.3, 80.4, 104.33, 165/104.34, 121–126, 185; 174/15.1, 15.2, 174/16.3, 252; 312/223.2, 223.3, 236
See application file for complete search history.

(56) References Cited

U.S. PATENT DOCUMENTS

| | | | | |
|---|---|---|---|---|
| 4,046,193 A * | 9/1977 | Dougherty | ............... | 165/104.21 |
| 4,642,715 A * | 2/1987 | Ende | ............... | 360/97.02 |
| 5,243,493 A | 9/1993 | Jeng et al. | ............... | 361/690 |
| 5,455,739 A * | 10/1995 | Barden | ............... | 361/719 |
| 5,570,270 A * | 10/1996 | Naedel et al. | ............... | 361/679.46 |
| 5,731,954 A | 3/1998 | Cheon | ............... | 361/699 |
| 6,038,129 A * | 3/2000 | Falaki et al. | ............... | 361/699 |
| 6,104,611 A * | 8/2000 | Glover et al. | ............... | 361/700 |
| 6,111,750 A * | 8/2000 | Gates | ............... | 361/700 |
| 6,178,088 B1 * | 1/2001 | Gates | ............... | 361/699 |

(Continued)

FOREIGN PATENT DOCUMENTS
DE 10311526 9/2004
(Continued)

OTHER PUBLICATIONS

Authorized Officer G. Anastassiades, PCT/US2009/056204; International Search Report and Written Opinion of the International Searching Authority, Dec. 3, 2009, 9 pgs.

*Primary Examiner* — Michail V Datskovskiy
(74) *Attorney, Agent, or Firm* — Sunstein Kann Murphy & Timbers LLP (57) ABSTRACT

Illustrative embodiments of the present invention are directed to a computer that has a housing with walls that form a substantially sealed interior cavity from an exterior environment. The computer includes a plurality of computer components within the interior cavity. The computer also includes at least one heat sink for dissipating thermal energy into the exterior environment. A cooling element is thermally coupled to the heat sink and at least one of the computer components to transfer thermal energy from the computer component into the heat sink and the exterior environment.

23 Claims, 10 Drawing Sheets

U.S. PATENT DOCUMENTS

| | | | |
|---|---|---|---|
| 6,209,631 B1 * | 4/2001 | Garcia-Ortiz | 165/287 |
| 6,234,240 B1 * | 5/2001 | Cheon | 165/80.3 |
| 6,252,726 B1 * | 6/2001 | Verdiell | 359/820 |
| 6,289,678 B1 * | 9/2001 | Pandolfi | 62/3.2 |
| 6,407,911 B1 | 6/2002 | Spence et al. | 361/683 |
| 6,434,000 B1 * | 8/2002 | Pandolfi | 361/679.33 |
| 6,765,793 B2 * | 7/2004 | Kehret et al. | 361/690 |
| 6,796,372 B2 * | 9/2004 | Bear | 165/104.21 |
| 6,798,661 B1 * | 9/2004 | Barsun et al. | 361/700 |
| 6,944,022 B1 * | 9/2005 | Kehret et al. | 361/690 |
| 7,012,807 B2 * | 3/2006 | Chu et al. | 361/699 |
| 7,072,179 B1 | 7/2006 | Curran et al. | 361/687 |
| 7,130,193 B2 * | 10/2006 | Hirafuji et al. | 361/700 |
| 7,177,154 B2 * | 2/2007 | Lee | 361/704 |
| 7,277,286 B2 * | 10/2007 | Lee | 361/700 |
| 7,286,365 B2 * | 10/2007 | Sarno et al. | 361/721 |
| 7,295,436 B2 | 11/2007 | Cheon | 361/699 |
| 7,301,776 B1 * | 11/2007 | Wang et al. | 361/737 |
| 7,365,982 B2 * | 4/2008 | He | 361/700 |
| 7,447,017 B2 * | 11/2008 | Koo | 361/688 |
| 7,633,757 B2 * | 12/2009 | Gustine et al. | 361/714 |
| 7,719,828 B2 * | 5/2010 | Brown et al. | 361/679.34 |
| 7,747,787 B2 * | 6/2010 | Lum | 709/252 |
| 7,845,395 B2 * | 12/2010 | Chu | 165/104.33 |
| 2004/0218362 A1 * | 11/2004 | Amaro et al. | 361/697 |
| 2005/0060444 A1 | 3/2005 | Lum | 710/36 |
| 2005/0168941 A1 * | 8/2005 | Sokol et al. | 361/688 |
| 2005/0286229 A1 * | 12/2005 | Ku | 361/709 |
| 2006/0267192 A1 | 11/2006 | Chen | 257/724 |
| 2007/0263355 A1 * | 11/2007 | Yu et al. | 361/700 |
| 2008/0064524 A1 * | 3/2008 | Bryant et al. | 473/340 |
| 2008/0177899 A1 | 7/2008 | Lum | 709/252 |

FOREIGN PATENT DOCUMENTS

JP 02002100892 A * 4/2002

* cited by examiner

RUGGEDIZED COMPUTER CAPABLE OF OPERATING IN HIGH-TEMPERATURE ENVIRONMENTS

The present application claims the benefit of U.S. Application Ser. No. 61/095,243, filed Sep. 8, 2008, which application is incorporated herein by reference in its entirety.

TECHNICAL FIELD

The present invention relates to computers, and more particularly to ruggedized computers.

BACKGROUND ART

Computer systems often are used in extreme environments. For example, modern warships, vehicles, and aircraft use a variety of computer systems for tasks ranging from navigation to weapons discharge. Many of these computer systems may be subjected to environments with high temperatures. Also, during a combat situation, such computer systems can be subjected to contamination (e.g., water, dust, debris, and moisture) and significant G-forces (e.g., between 50-100 Gs) from explosions in their local vicinity.

The art has responded to this by developing "rugged" computer systems, which can withstand many of the extreme forces and conditions commonly associated with such environments. Yet, even these ruggedized computers may be vulnerable to a combination of shock, extreme temperature, and contaminants, such as water, debris, dust, or moisture. For example, computers typically use cooling fans to exchange air between the interior cavity of the computer and the exterior environment. The exchange of air helps cool the components in the interior cavity of the computer. To operate at higher temperatures, the rate or volume of air exchange can be increased to more readily dissipate thermal energy. The increase in the rate or volume of air exchange, however, often is accompanied by an increased influx of damaging contaminants into the interior cavity of the computer.

SUMMARY OF THE INVENTION

In accordance with one embodiment of the invention, a computer has a housing with walls that form a substantially sealed interior cavity from an exterior environment. The computer includes a plurality of computer components within the interior cavity. The computer also includes at least one heat sink for dissipating thermal energy into the exterior environment. A cooling element is thermally coupled to the heat sink and at least one of the computer components to transfer thermal energy from the computer component into the heat sink and the exterior environment. Thus, some embodiments of the computer may be fan-less.

In some embodiments of the present invention, at least one computer component is thermally coupled to a wall of the housing. In further specific embodiments, the computer component is thermally coupled to a top wall of the housing via a thermal pad.

Furthermore, in various embodiments, the cooling element also comprises at least one pipe that thermally couples the computer component(s) to the heat sink(s). In some exemplary embodiments, the transfer of thermal energy within the pipe occurs at least in part by convection. Thus, in some embodiments, the pipe contains a fluid. The cooling element may also include a block that is thermally coupled to the computer component and the pipe. In some cases, the pipe and the block form an interface that includes a thermal compound. Also, in illustrative embodiments, the heat sink is integral to at least one wall of the housing.

Some embodiments of the computer meet Grade-A of the United States Military's MIL-S-901D specification for shock. Thus, in further specific embodiments, the computer includes a solid-state hard drive. However, in other specific embodiments, the computer contains only solid-state components.

Some embodiments of the computer meet the United States Military's MIL-S-461E specification for electromagnetic interference. Thus, in some embodiments, a portion of the housing includes a conductive material to protect the plurality of computer components from electromagnetic interference.

Additionally or alternatively, in various embodiments of the present invention, the interior cavity of the computer meets the National Electrical Manufacturers Association's standard type 3S for enclosure types.

Some embodiments of the computer are capable of operating in an exterior environment with a temperature of 60° Celsius. Additionally or alternatively, some embodiments of the computer can operate in an exterior environment with humidity ranging between 10% to 90%.

In accordance with another embodiment of the invention, a computer has a housing including walls that form a substantially sealed interior cavity from an exterior environment. The computer includes a plurality of computer components within the interior cavity. The computer also includes a means for dissipating thermal energy into the exterior environment and a means for cooling that is thermally and physically coupled between at least one of the computer components and the means for dissipating.

In illustrative embodiments of the present invention the at least one computer component is thermally coupled to a wall of the housing. In further specific embodiments, the computer component is thermally coupled to a top wall of the housing via a thermal pad. In some embodiments, the means for cooling has no moving components. Also, in some embodiments, the computer consumes at least 10 Watts of power.

In accordance with yet another embodiment of the invention, a computer has housing that includes walls that form a substantially sealed interior cavity from an exterior environment and a plurality of computer components within the interior cavity. During operation, the computer consumes at least 5 Watts of power. In other illustrative embodiments, the computer consumes at least 10, 20, or 100 Watts of power.

Illustrative embodiments of the present invention are also directed to a method of using any of the above described computer embodiments. The method includes providing a computer as defined in any of the above described embodiments and operating the computer in an exterior environment with temperatures between 60° and 65° Celsius. In additional or alternative embodiments, the method includes operating the computer in an exterior environment with humidity between of 80% and 90%.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In illustrative embodiments of the present invention, a computer has a housing with a substantially sealed interior cavity. Instead of a fan, the computer has a cooling element and a heat sink to cool a plurality of computer components within the interior cavity. The combination of the cooling element and the sealed interior cavity advantageously both allows the computer to operate in high temperature environments and prevents introduction of contamination (e.g., dust, debris, moisture, and water) into the interior cavity of the computer. Details of illustrative embodiments are discussed below.

Figure 1:
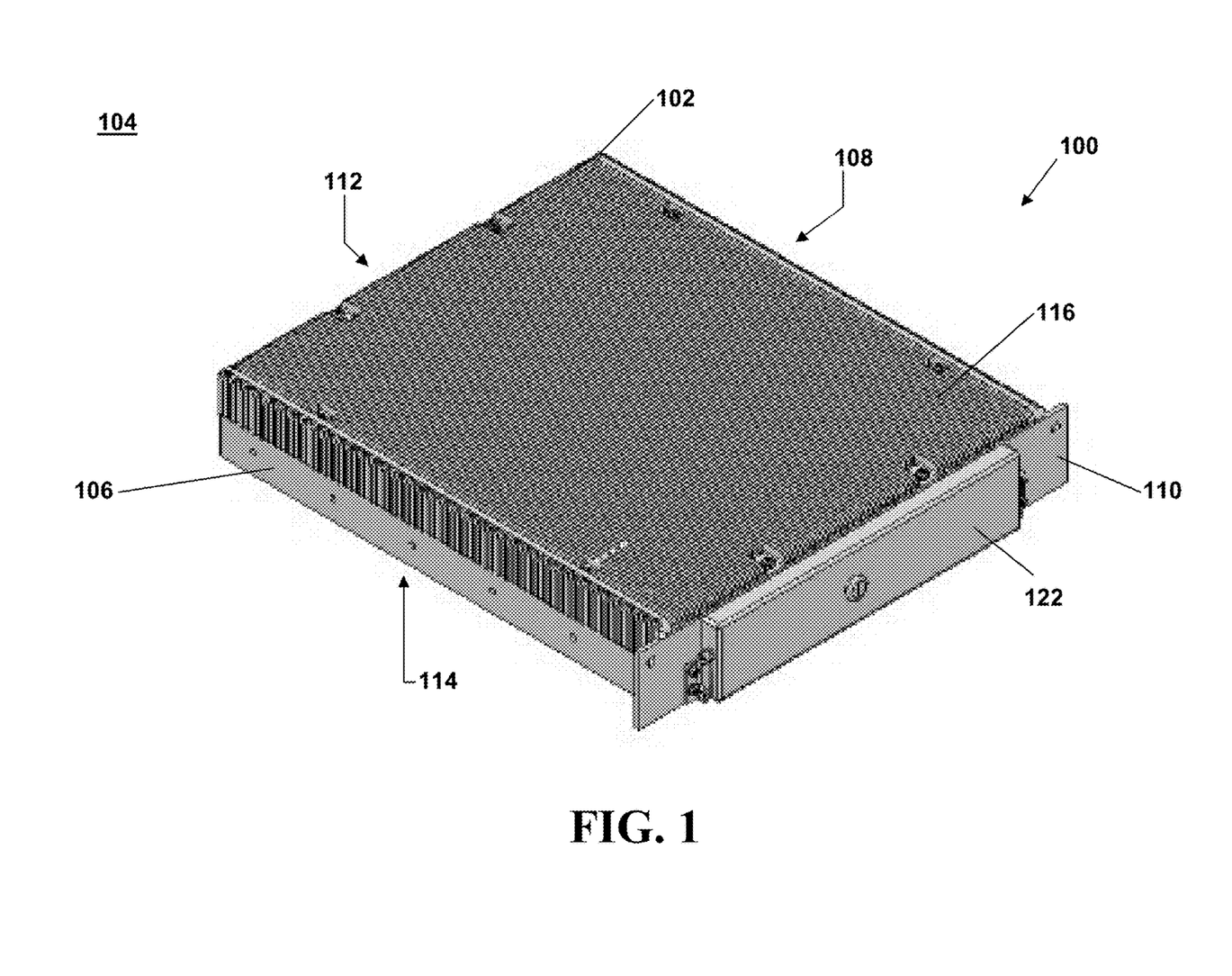
FIG. 1 schematically shows a front isometric view of a computer in accordance with various embodiments of the present invention.

FIG. 1 schematically shows a front isometric view of a computer 100 in accordance with various embodiments of the present invention. The computer 100 includes a housing 102 with walls 106, 108, 110, 112, 114, 116 that form an interior cavity 202 (shown in FIG. 2). Specifically, the housing 102 includes two side walls 106, 108, a front wall 110, a back wall 112, a bottom wall 114, and a top wall 116. These six walls 106, 108, 110, 112, 114, 116 collectively form the interior cavity 202. Although conventional wisdom suggests allowing heat-dissipation through air-exchange, illustrative embodiments of the present invention include an interior cavity 202 that is substantially sealed from an exterior environment 104. Based on the intended use and application of the computer (e.g., use in an environment with few or many contaminants), the housing 102 may be designed to meet different standards of impermeability. Generally, the substantially sealed interior cavity should be impermeable to solid particles and visible debris. In other embodiments, however, the requirements for impermeability may be more stringent. For example, a substantially sealed interior cavity may be impermeable to liquids, such as sea water, or gasses, such as air or water vapor (e.g., hermetically sealed). Further, in some embodiments, the interior cavity may be pressurized to help prevent the in-flow of contaminants. The interior cavity may also be purged and then pressurized with a gas, such as argon or nitrogen, to prevent condensation build up in the interior cavity. Some embodiments, thus, may comply with the National Electrical Manufacturers Association's (NEMA) standard type 3S for enclosures.

Among other ways, to achieve the substantially sealed interior cavity 202 (shown in FIG. 2), the housing 102 may employ one or more gaskets and/or O-rings. Other methods known in the art, however, may also achieve the substantially sealed interior cavity 202. Additionally or alternatively, an adhesive sealant or an interference fit between the walls of the housing 102 may form the seal.

Figure 2:
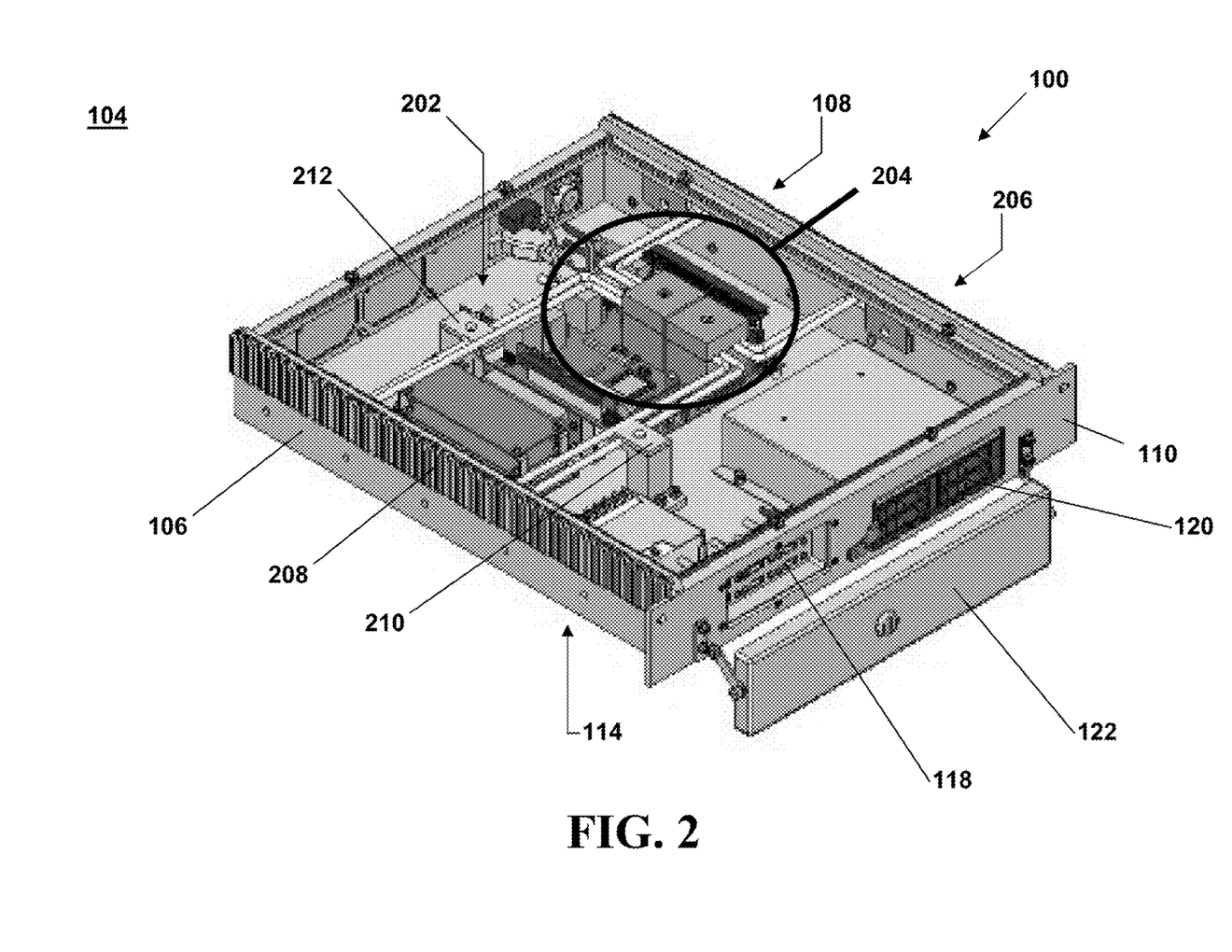
FIG. 2 schematically shows a computer configured in accordance with various embodiments of the present invention with its top wall removed.

Also, the computer 100 may include several communication ports 118 (see FIG. 2). For example, the computer 100 may include one or more serial, parallel, Ethernet, USB, or graphical interface ports 118. The computer 100 may also include interfaces 120 (shown in FIG. 2) for facilitating communication and device interaction. The ports 118 and interfaces 120 are located on the front wall 110 of the housing 102 and, undesirably, each of them is a potential entry point for contaminants. To ensure that contaminants do not enter the interior cavity 202 through ports 118 and interfaces 120, illustrative embodiments may have a hinged door 122 that allows access to the ports and interfaces when open, but creates a substantially impermeable seal when closed. Furthermore, in illustrative embodiments, connections between the computer 100 and various power and communication cables are made with IP67 and IP68 (international protection) rated connectors. Such connectors create seals that prevent inflow of moisture and debris into the interior cavity 202.

FIG. 2 schematically shows an isometric view of the computer 100 with the top wall 116 removed. In certain embodiments, the top wall 116 may be a removable panel to facilitate access to the interior cavity 202. The interior cavity 202 of the computer includes a plurality of computer components. The components may include, but are not limited to, a microprocessor (e.g., central processing unit), a random access memory, a power supply, a hard drive, and an Ethernet card. These computer components may produce a significant amount of thermal energy when operating. If not dissipated, the thermal energy can impair the performance of the computer 100 and may eventually cause the computer to fail. The thermal energy inside the interior cavity 202 can be further exacerbated when the exterior environment 104 is relatively hot (e.g., 60° Celsius).

To mitigate this heat problem, many prior art computers use cooling fans to exchange air between the interior cavity 202 and the exterior environment 104. Undesirably, the cooling fan may introduce damaging contaminants into the computer 100. Accordingly, illustrative embodiments of the present invention do not employ a cooling fan to exchange air between the interior cavity 202 and the exterior environment 104.

Instead, illustrative embodiments of the present invention use a cooling element 204 and two heat sinks 206, 208 to dissipate the thermal energy produced by the computer components. (Reference number 204 generally designates the cooling element. The cooling element does not include all the components in the circle). The addition of the cooling element 204 and heat sinks 206, 208 allow the computer 100 to operate in high temperature environments without the use of a fan. They also permit high-temperature operation without air-exchange between the exterior environment 104 and the substantially sealed interior cavity 202 of the computer 100. The heat sinks 206, 208 illustratively are located outside the interior cavity 202 to dissipate thermal energy into the exterior environment 104. In the embodiment depicted in FIG. 2, for example, the computer 100 includes two heat sinks 206, 208 that stretch along the side walls 106, 108 of the housing 102. The heat sinks 206, 208 include a plurality of fins to increase the surface area of the heat sinks. Typically, the dissipation of thermal energy into the exterior environment 104 is a function of the surface area of the heat sinks 206, 208. Therefore, it is advantageous to employ heat sinks 206, 208 with large surface areas.

In the embodiment shown in FIG. 2, the heat sinks 206, 208 are integral to the side walls 106, 108 of the housing 102. In other words, one heat sink 206, 208 and one side wall 106, 108 are formed together as one component. In other embodiments, the heat sinks 206, 208 can be affixed or attached to the one or more walls 106, 108, 110, 112, 114, 116 of the housing 102. In yet other embodiments, the heat sinks 206, 208 may be separate from the walls 106, 108, 110, 112, 114, 116 and housing 102 of the computer 100.

Figure 3:
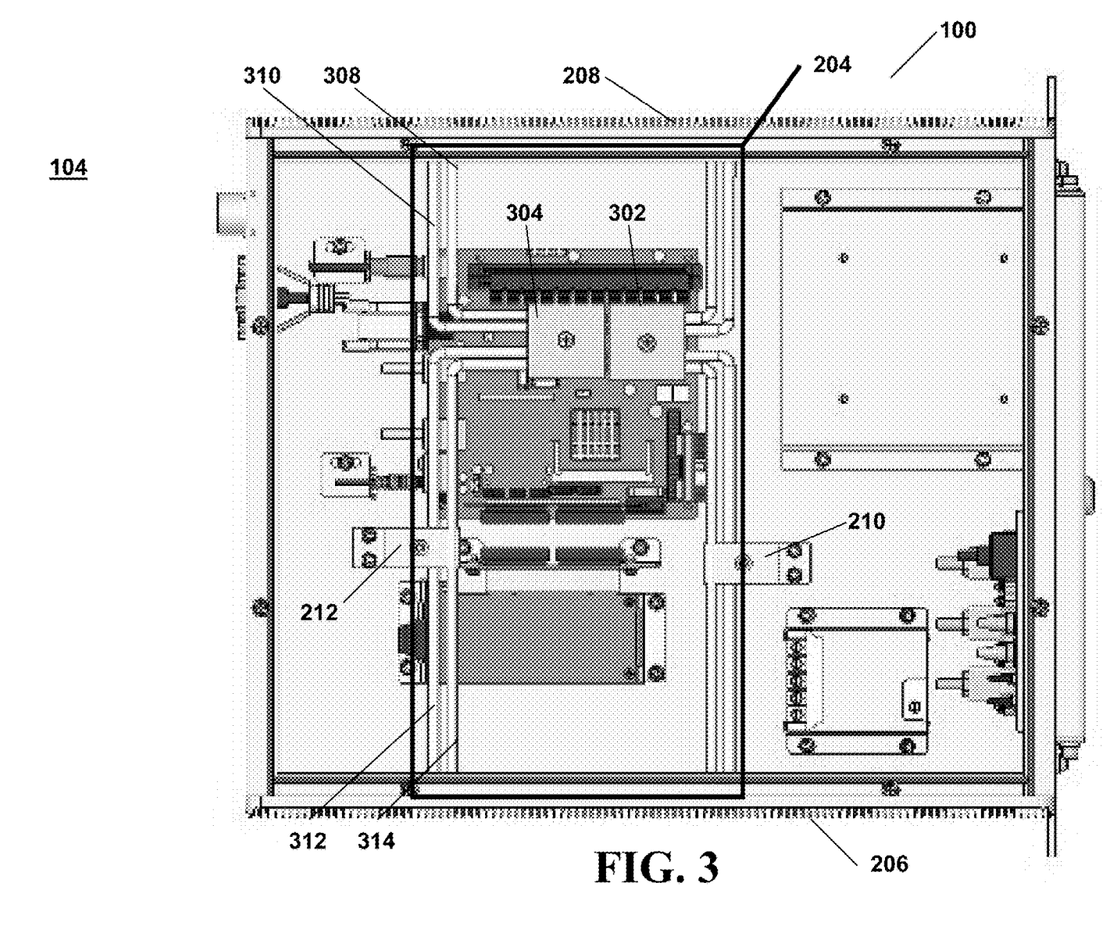
FIG. 3 schematically shows a top view of a computer in accordance with various embodiments of the present invention.
Figure 4:
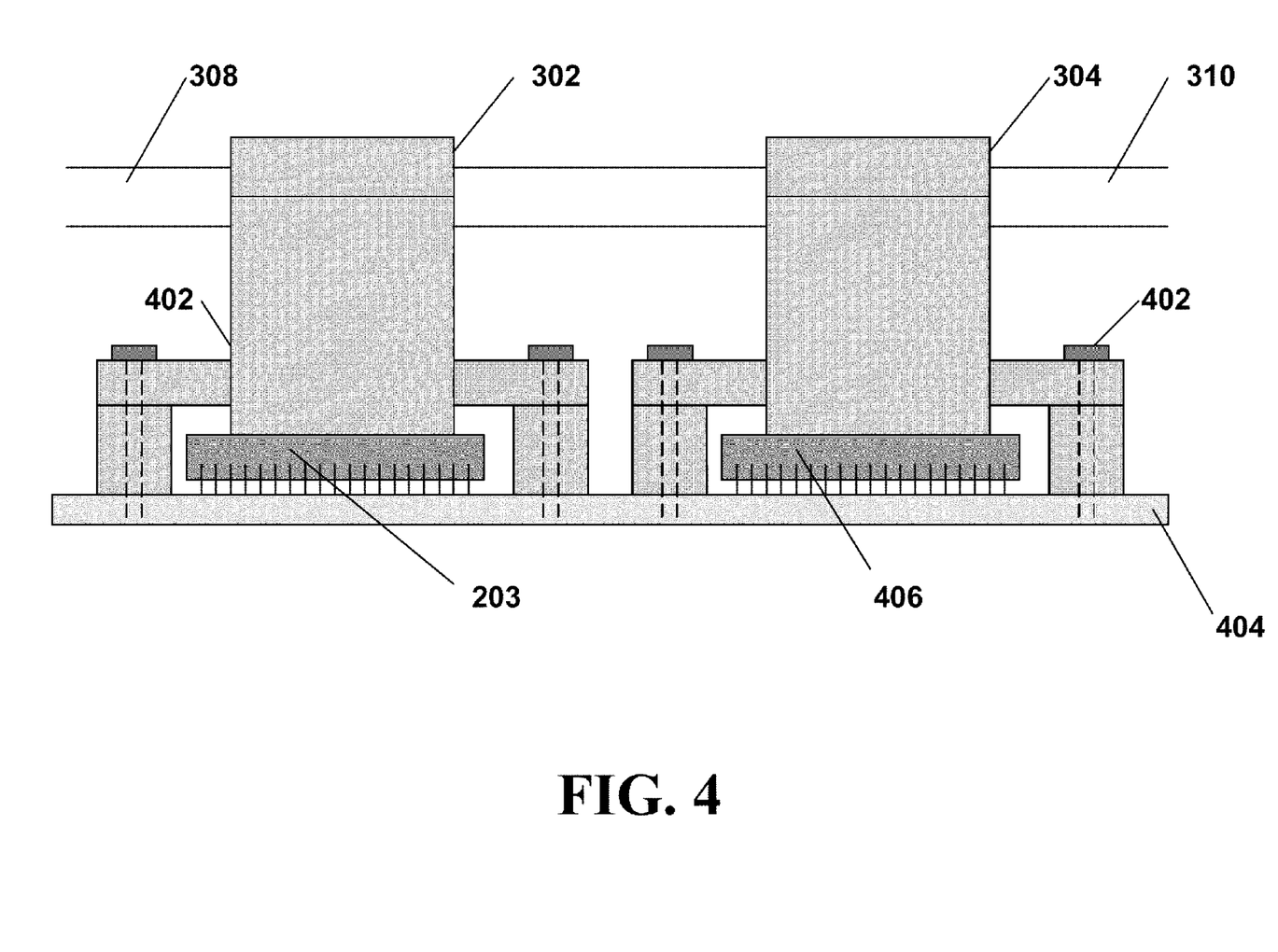
FIG. 4 schematically shows a cross-sectional view of a block thermally coupled to a microprocessor in accordance with various embodiments of the present invention.

The computer 100 also includes at least one cooling element 204 thermally coupled between at least one computer component and at least one heat sink 206, 208. The cooling element 204 transfers thermal energy from the computer components to the heat sinks 206, 208. In illustrative embodiments, the cooling element 204 is physically coupled to the at least one computer component and the at least one heat sink 206, 208. FIG. 3 schematically shows a top view of the computer 100 in accordance with various embodiments of the present invention. The top view more clearly depicts the lay-out of the computer components, cooling element 204, and the heat sinks 206, 208. (Again, reference number 204 generally designates the cooling element. The cooling element does not include all the components in the square). Illustrative embodiments of the cooling element include at least one block and at least one pipe. In some embodiments, the block may be formed from a variety of different metals or metal alloys. The metals or metal alloys may include copper, aluminum, gold, and/or silver. In the embodiment depicted, the cooling element 204 includes two blocks 302, 304. One block 302 is thermally coupled to the microprocessor 203 of the computer 100. The other block 304 is thermally coupled to another integrated circuit chip 406. FIG. 4 provides a more detailed view of the coupling arrangement of the microprocessor 203, the integrated circuit chip 406, and the block 302, 304. Specifically, elements are "thermally coupled" when an interface between the elements, through sufficient contact, transfers thermal energy. In the embodiment shown in FIG. 4, blocks 302, 304 are thermally and physically coupled to the microprocessor 203 and the integrated circuit chip 406 using screws 402 that fasten the blocks to a circuit board 404. However, in alternative or additional embodiments, a thermal adhesive is used to thermally couple and physically secure the blocks 302, 304 to the microprocessor 203 and the integrated circuit chip 406.

The blocks 302, 304 are also thermally coupled to four pipes 308, 310, 312, 314 (e.g., heat pipes), which are in turn coupled to the heat sinks 206, 208 on either side of the housing 102. The heat sinks 206, 208 may be formed from a variety of different metals or metal alloys including copper, aluminum, gold, and/or silver. Thus, as the microprocessor 203 and the circuit chip 406 operate and create thermal energy, the blocks 302, 304 conduct the thermal energy away from the microprocessor and the circuit chip. Then, the pipes 308, 310, 312, 314, which are thermally coupled to the blocks 302, 304, transfer the thermal energy from the blocks to the heat sinks 206, 208, which, in turn, dissipate the thermal energy into the exterior environment 104. Accordingly, thermal energy is transferred from the microprocessor 203 and the integrated circuit chip 406 to the exterior environment 104.

In exemplary embodiments of the present invention, the pipes 308, 310, 312, 314 are similar to pipes manufactured by Enertron™. Furthermore, in alternative or additional embodiments, the cooling element 204 (including the pipes 308, 310, 312, 314 and blocks 302, 304) is the BorgFX™ CPU—heat pipe processor cooler and/or the BorgFX™ VGA—heatpipe GPU cooler. The cooling element 204 may be further modified to fit the requirements of an application using the BorgFX™ Bridge—heatpipe bridge cooler and/or the BorgFX™ Extension—heatpipe extension set.

Various arrangements and modifications of the cooling element 204 are also within the scope of various embodiments of the present invention. For example, the computer 100 may include one block thermally coupled to several computer components (e.g., an integrated circuit chip set). Alternatively, the computer 100 may include several blocks that each are thermally coupled to one of several computer components. Each of the blocks may be thermally coupled to several pipes or a single pipe may transfer thermal energy from all the blocks to a single heat sink. Further, not all of the computer components must be coupled to the cooling element 204. Certain components, such as the power supply 207, may be more robust and may tolerate operation at high temperatures. Accordingly, it may not be necessary to thermally couple such components to the cooling element 204, whereas more heat sensitive components, such as the microprocessor 203 and hard drive, may need to be thermally coupled to the cooling element.

Figure 5:
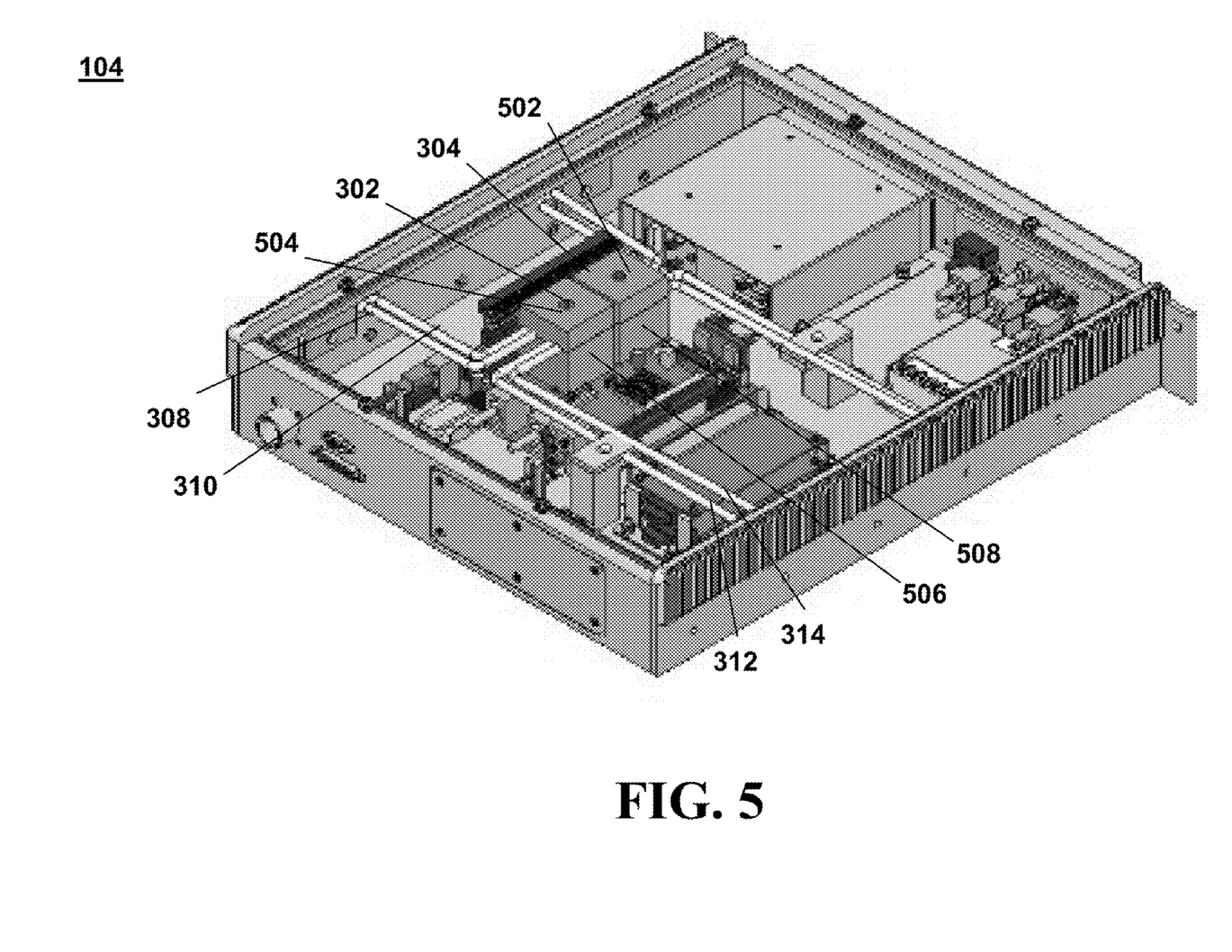
FIG. 5 schematically shows a rear isometric view of a computer in accordance with various embodiments of the present invention.
Figure 6:
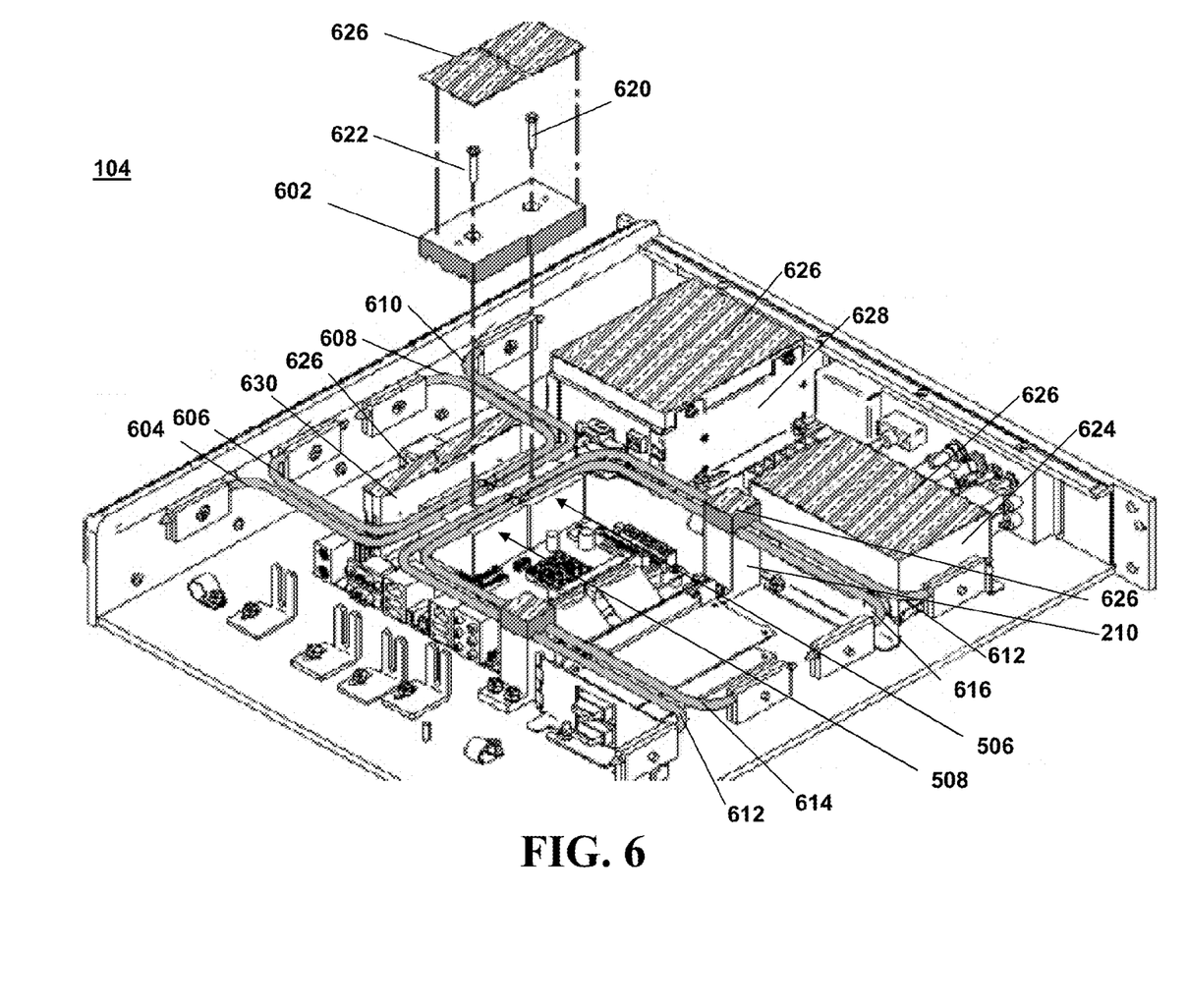
FIG. 6 schematically shows another rear isometric view of a computer in accordance with various embodiments of the present invention.

The thermal interface between the components may also vary. In some embodiments, a portion of the pipe may be adjacent to or in contact with the exterior surface of the blocks. In other embodiments, the pipe may be placed at least partially within the blocks. For example, in the embodiment shown in FIG. 5, each of the two blocks 302, 304 includes cover portions 502, 504 and base portions 506, 508. The four pipes 308, 310, 312, 314 are placed between the cover portions 502, 504 and the base portions 506, 508 of the blocks 302, 304. The pipes 308, 310, 312, 314 are compressively-clamped between the cover portions 502, 504 and the base portions 506, 508 to ensure good thermal coupling. To further facilitate thermal energy transfer, a thermal compound may be applied to the blocks and/or the pipes. Examples of the thermal compound include Artic Silver™ 5 High-Density Polysynthetic Silver Thermal Compound and/or Kingwin™ WF-2 White Freeze High Density Thermal Compound. FIG. 6 provides another example wherein a single cover portion 602 compressively-clamps pipes 604, 606, 608, 610, 612, 614, 616, and 618 to two base portions 506, 508. In the embodiment in FIG. 6, screws 620, 622 are used to secure the cover portion 602 to the two base portions 506.

Figure 7:
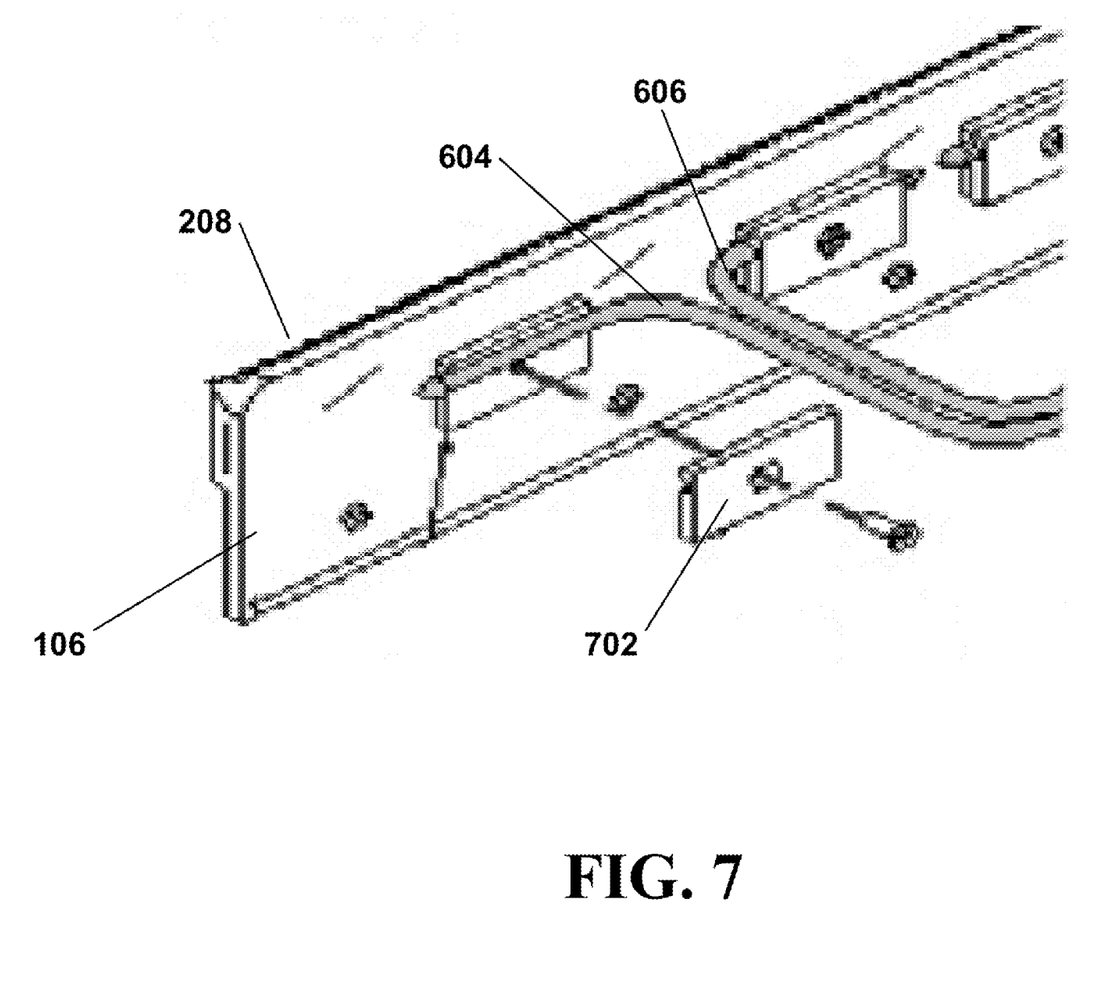
FIG. 7 schematically shows a detail of a pipe thermally coupled to a heat sink in accordance with various embodiments of the present invention.

Similar arrangements may also be used to thermally couple the pipes 308, 310, 312, 314 to the heat sinks 206, 208. For example, in FIG. 7, a cover portion 702 is used to compressively-clamp pipe 604 to the side wall 106 and heat sink 208. In this manner, the pipes 308, 310, 312, 314 are thermally and physically coupled to the heat sinks 206, 208. In other embodiments, the heat sinks 206, 208 and/or side walls 206, 210 may include cylindrical bores. Thermal compound may be applied to the cylindrical bores and/or the ends of the pipes 308, 310, 312, 314. Then, the ends of the pipes 308, 310, 312, 314 may be interference fit into the cylindrical bores in the heat sinks 206, 208 and/or side walls 206, 210. The interference fit provides for a good physical connection and thermal coupling between the pipes 308, 310, 312, 314 and the heat sinks 206, 208.

The pipes may have various arrangements and structures as well. For example, in the embodiment depicted in FIGS. 3 and 5, the pipes 308, 310, 312, 314 have a "U" shape and each pipe is thermally coupled to a heat sink 206, 208 at two points.

However, in other embodiments, such as the one shown in FIG. 6, the pipes 604, 606, 608, 610, 612, 614, 616, and 618 may have a "Z" or "S" shape and each pipe may only be coupled to a heat sink 206, 208 at one point. Also, in the embodiment shown in FIG. 7, a portion of the pipes may run along a length of the heat sink 208. In certain embodiments, the pipes 308, 310, 312, 314 may have the concentric structure (i.e., one inside the other) shown in FIGS. 3 and 5. In other embodiments, however, the pipes may intersect or run one on top of each other.

In illustrative embodiments of the present invention, the pipes 308, 310, 312, 314 are made from a thermally conductive material such as a metal or metal alloy containing copper, aluminum, gold, and/or silver. In this manner, some embodiments of the present invention use thermal conductance to transfer thermal energy from the computer components to the heat sinks 206, 208. The thermally conductive materials transfer thermal energy from the computer components, which are at high temperatures, to the heat sinks 206, 208, which are at lower temperatures.

Some embodiments of the present invention may use a combination of thermal conductance and thermal convection to transfer thermal energy from the computer components to the heat sinks 206, 208. For example, in illustrative embodiments of the present invention, the pipes 308, 310, 312, 314 are hollow and contain a fluid such as methanol, nitrogen, water, and/or ammonia. In some embodiments, a pump may be used to transfer the fluid from the computer components to the heat sinks 206, 208. However, in other more advantageous embodiments, a pump is not used. Instead, in some embodiments, the hollow pipes 308, 310, 312, 314 include a porous material that moves the fluid in its liquid phase by capillary action. The fluid is moved from the heat sinks 206, 208 to the thermal interface of the computer components. At the thermal interface of the computer components, the fluid evaporates and flows in its gaseous state to the thermal interface of the heat sink 206, 208 where it condenses. The fluid then moves back towards the electronic components by capillary action to evaporate and repeat the cycle. Thus, the fluid absorbs thermal energy when it evaporates at the computer component and then releases the thermal energy when it condenses at the heat sinks 206, 208. In this manner, exemplary embodiments of the present invention use thermal convection to transfer thermal energy from the computer components to the heat sinks 206, 208. In illustrative embodiments of the present invention, the porous material in the pipes 308, 310, 312, 314 is sintered powdered metal. However, in other embodiments, the pipes 308, 310, 312, 314 can use other porous materials to facilitate capillary action, such as mesh material and/or grooves in inner walls of the pipes.

Figure 8:
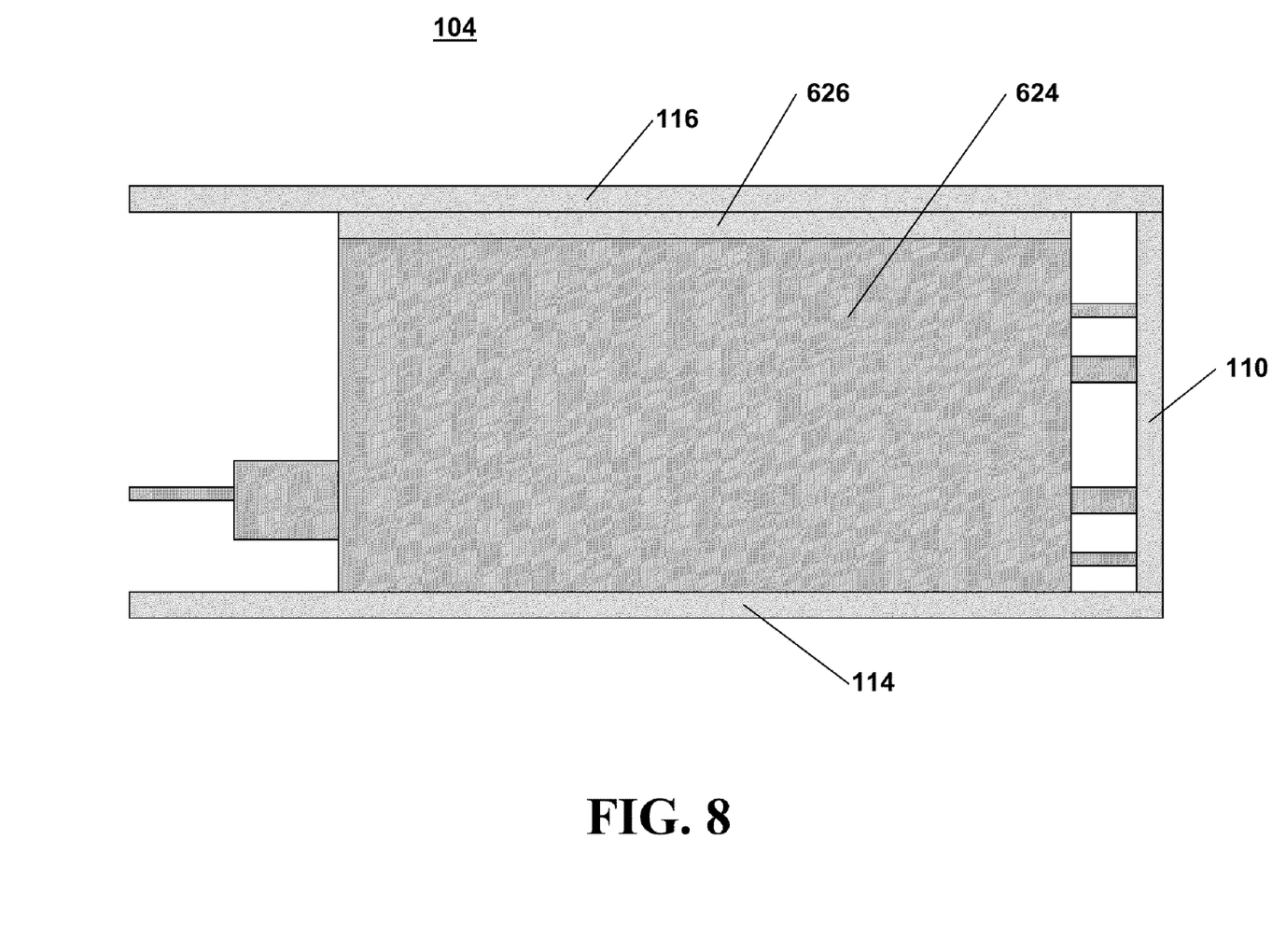
FIG. 8 schematically shows a cross-sectional view of a power supply thermally coupled to a top wall in accordance with various embodiments of the present invention.

During experimentation, the inventors discovered that thermal energy can also be transferred from the computer components to the exterior environment 104 by stacking the computer components and/or the blocks 302, 304 against at least one of the walls 106, 108, 110, 112, 114, 116 of the computer 100. FIG. 8 schematically shows a cross-sectional view of a power supply 624 thermally coupled to a top wall 116 in accordance with various embodiments of the present invention. In the embodiment shown, the computer 100 is designed so that the power supply 624 contacts the top wall 116 when the top wall is installed onto the housing 102, thereby facilitating transfer of thermal energy into the exterior environment 104. In some illustrative embodiments, any one or more of the power supply 116, the top wall 110, the front wall 110, and/or other components of the computer 100 may include tolerances that insure that there is a precise fit between the power supply 624 and the top wall 116 (e.g., +/−0.001 in). A large surface area of contact between the power supply 624 and the top wall 116 facilitates thermal energy transfer.

In some embodiments, a thermal pad 626 is applied between the power supply 624 and the top wall 116. The thermal pad 626 thermally couples the power supply 624 to the top wall 116 and further facilitates the transfer of thermal energy from the power supply to the top wall. Also, in some cases, when the thermal pad 626 is used, the tolerances of the one or more components of the computer 100 may be lower (e.g., +/−0.01 in) because the pad provides a compressible thermal coupling between the power supply 624 and the top wall 116. Examples of the thermal pad 626 include Chomerics™ Cho-Therm T500 and/or T-Global Technology™ H48-2 Thermal Pad. Although not shown in FIG. 8, in other embodiments, the thermal pad 626 can also be used to thermally couple the power supply 624 to other walls of the housing 102, such as the side wall 106.

Furthermore, in illustrative embodiments, multiple components may be thermally coupled to the one or more walls 106, 108, 110, 112, 114, 116 of the housing 102. As can be seen in FIG. 6, the thermal pad 626 is placed on top of the power supply 624 and will contact the top wall 116 when the top wall is installed. A similar arrangement exists for the disk drive 628 and the memory 630.

Figure 9:
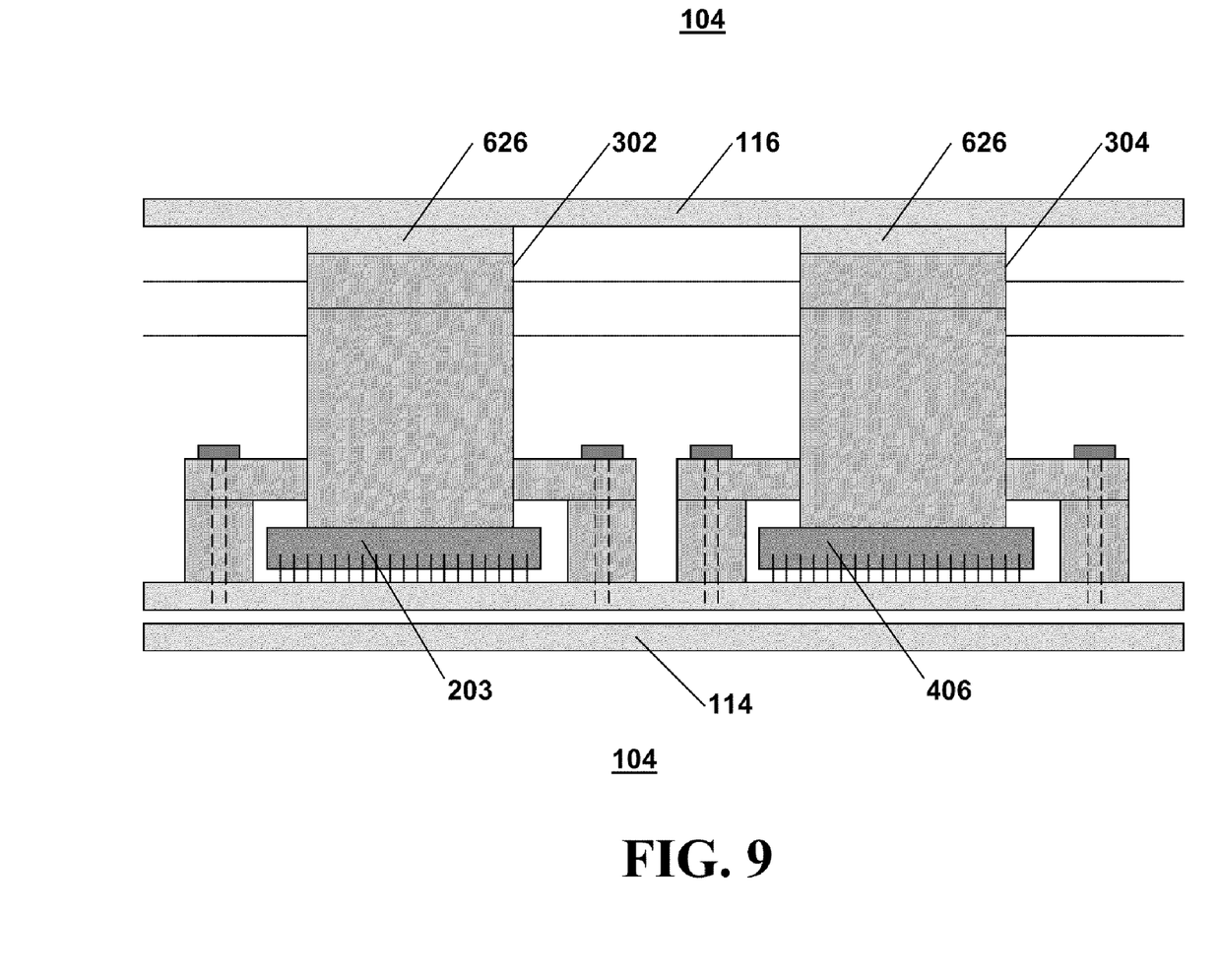
FIG. 9 schematically shows a cross-sectional view of a block thermally coupled to a top wall in accordance with various embodiments of the present invention.

FIG. 9 schematically shows a cross-sectional view of the two blocks 302, 304 thermally coupled to a top wall 116 in accordance with various embodiments of the present invention. As explained above, the computer 100 includes two blocks 302, 304 that are thermally coupled to the microprocessor 203 and the integrated circuit chip 406. The computer 100 design and the tolerances are such that, when the top wall 116 is installed, the blocks 302, 304 are in contact with the top wall of the computer 100 (e.g., tolerances of +/−0.001 in). In this manner, thermal energy is transferred from the microprocessor 203 and the blocks 302, 304 into the top wall 116 and the exterior environment 104. Thus, in the embodiment in FIG. 9, the thermal blocks 302, 304 not only transfer thermal energy to pipe 308, but also transfer energy to the top wall 116. To further facilitate thermal energy transfer, thermal pads 626 may be applied between the top wall 116 and the blocks 302, 304. As explained above, the thermal pads 626 help facilitate thermal energy transfer between the blocks and the wall and, in some cases, allow one or more of the computer components to have lower tolerances (e.g., +/−0.01 in). Similar configurations may also be used to transfer thermal energy from other computer components to anyone of the walls 106, 108, 110, 112, 114, 116. For example, in FIG. 6, bracket 210 is thermally coupled to the top wall 116 using the thermal pad 626.

By using the cooling element 204 and heat sinks 206, 208 in conjunction with thermally coupling computer components to the walls 106, 108, 110, 112, 114, 116, the inventors surprisingly discovered that illustrative embodiments of the computer 100 can operate in high-temperature environments as high as 65° Celsius.

The performance of the computer 100 in high-temperature environments may be further enhanced by appropriate power management. Indeed, elimination of the fan itself helps reduce power consumption and results in a reduction of thermal energy generated by the computer 100. Other improvements are also within the scope of various embodiments of the present invention. For example, each of the microprocessor 203, the power supply, the hard drive and other computer components may be selected to consume and require minimal amounts of power. In one exemplary embodiment, components are selected to conform with the following requirements:

Power Supply provides no more than 120 Watts
Central Processing Unit consumes no more than 70 Watts
PCI Cards consume no more than 10 Watts each
Hard Drives consume no more than 5 Watts each
USB Devices consume no more than 2.5 Watts each On the other hand, exemplary embodiments of the present invention are generally directed to a computer 100 that consumes at least 5, 10, 20, or 100 Watts, such as a desk-top, a lap-top, and/or a rack mounted computer. For example, in one illustrative embodiment, the computer 100 includes the following components:

Mini-ITX™ motherboard
Intel Core2™ Duo or Quad processor
2.5" SSD hard drive
Absopulse™ Encapsulated 12V or a Pico™ PSU120 power supply. Furthermore, the computer 100 itself may also be tuned to consume minimal amounts of power. For example, the computer 100 may be programmed to enter sleep mode or other power saving modes when not in use. The individual components may also be programmed to enter sleep mode or other power saving modes when not in use. Various other power saving methods and configurations known in the art may also be implemented. Generally, the less power each component consumes, the less thermal energy each component generates and the more easily the cooling element 204 can cool each of the components.

A prototype employing the above depicted design (FIG. 6) was tested in an exterior environment with temperatures as high as 65° Celsius. The prototype operated reliably in the 65° Celsius exterior environment and within exterior environments ranging between −20° and 65° Celsius. The prototype also operated in exterior environments with humidity ranging between 10% and 90%. The design is also expected to substantially increase the mean time between failures.

Certain embodiments of the computer 100 may also have excellent vibration and shock resistance (e.g., they are ruggedized). The computer 100 may incorporate several features that provide vibration and shock resistance. First, the computer 100 may have solid-state components only. In other words, none of the computer components include moveable parts. For example, instead of a traditional rotational hard disk drive, the computer 100 may use a solid-state hard disc drive, such as a flash drive. Also, the computer 100 does not include other rotational components, such as compact disk drives, cooling fans, and/or pumps. As explained above, rather than using cooling fans or pumps, illustrative embodiments use the solid-state cooling element 204 and the heat sinks 206, 208. Second, the computer 100 includes two brackets 210, 212 that help secure the pipes 308, 310, 312, 314 to the housing 102 of the computer. Indeed, any of the computer components may include brackets and other supports to help secure components within the housing 102 and absorb the G-forces associated with an impact or an explosion. Third, the housing 102 and the walls 106, 108, 110, 112, 114, 116 of the computer 100 are made from a relatively hard and corrosive resistant material, such as anodized aluminum. The walls may also be relatively thick (e.g., 4 mm-7 mm) to prevent puncture by foreign objects and debris during explosions. These three features help provide the computer 100 with excellent shock resistance. In illustrative embodiments of the present invention, the above described design should meet Grade-A of the United States Military's MIL-S-901D specification for shock.

Exemplary embodiments of the computer 100 may also be resistant to electromagnetic interference (EMI). Generally, at least a portion of the housing 102 and the walls 106, 108, 110, 112, 114, 116 contain a conducting material, such as a metal or a metal alloy. The conducting material forms a faraday cage around the computer components that shields the computer components from electromagnetic radiation in the exterior environment 104. Further, the communications ports 118, such as USB and/or Ethernet connections, may employ electromagnetic filters to filter out EMI coming into the computer on signal lines. The type of EMI filter used may vary based on the intended application. The EMI filter may be, but is not limited to, an inductor-capacitor filter, shield filter, a ganged filter, a low profile filter, and a surface mountable filter. It is expected that embodiments of the present invention employing the above described design should meet the United States Military's MIL-S-461E specification for EMI.

Figure 10:
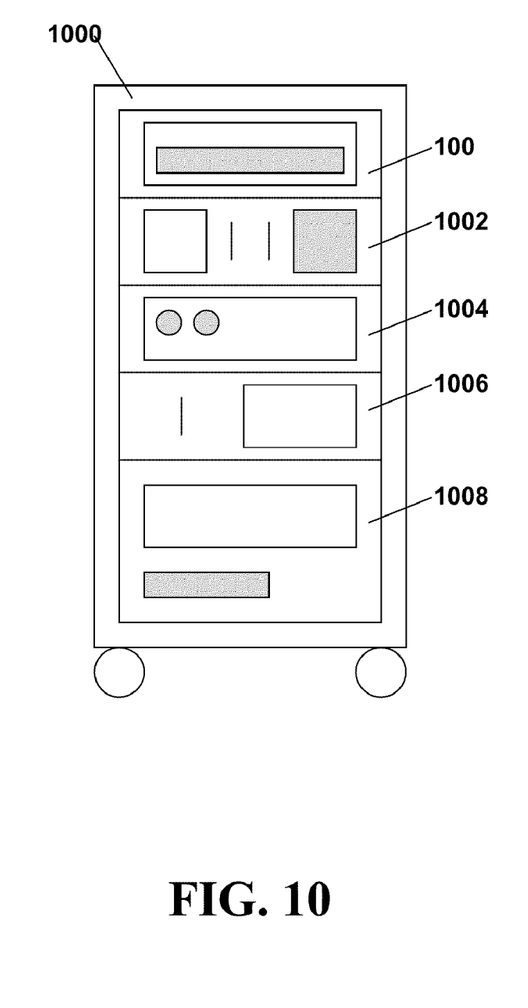
FIG. 10 schematically shows a rack with several rack mounted computers and controllers including a rack mounted computer in accordance with various embodiments of the present invention.

Illustrative embodiments of the computer 100 may have various shapes, sizes and configurations. The computer 100 shown in FIG. 1 is an example of a rack mounted computer. Such a rack mounted computer 100 can be installed in an equipment rack 1000. FIG. 10 schematically shows an equipment rack 1000 with several pieces of equipment mounted within the rack. Equipment racks save floor space and shelving space by vertically stacking several pieces of hardware equipment. In FIG. 10, the computer 100 is mounted in the top slot of the equipment rack 700. The four other spots in the equipment rack may be occupied by other computers, servers, and/or controllers 1002, 1004, 1006, 1008. The computer 100 shown in FIGS. 1-9 is one rack unit in height (1U), and 19 inches in width, however, other embodiments are not limited to these dimensions. For example, other embodiments may be two units (2U) in height and 23 inches in width. Moreover, other embodiments of the computer may not be rack mounted, but instead may be installed directly within electromechanical systems (e.g., aircraft and vehicles) or may be free-standing (e.g., desk-top or lap-top computers).

The embodiments of the computer described above are intended to be merely exemplary; numerous variations and modifications will be apparent to those skilled in the art. All such variations and modifications are intended to be within the scope of the present invention.

What is claimed is:

1. A computer comprising:
   a housing including walls that form a substantially sealed interior cavity from an exterior environment;
   a plurality of computer components within the interior cavity;
   at least one block thermally coupled to at least one computer component and a top wall of the housing to transfer thermal energy from the at least one computer component and the at least one block into the top wall and the exterior environment;
   at least one heat sink located on at least one wall of the housing for dissipating thermal energy into the exterior environment; and
   at least one pipe thermally coupled to the at least one block and the at least one heat sink to transfer thermal energy from the at least one block and the at least one computer component into the at least one heat sink and the exterior environment.

2. A computer according to claim 1, wherein at least one computer component is thermally coupled to a wall of the housing.

3. A computer according to claim 1, wherein the at least one block is thermally coupled to the wall of the housing via a thermal pad.

4. A computer according to claim 1, wherein the transfer of thermal energy through the at least one pipe occurs at least in part by convection.

5. A computer according to claim 1, wherein the at least one pipe and the at least one block form an interface and the interface includes a thermal compound.

6. A computer according to claim 1, wherein the at least one pipe contains a fluid.

7. A computer according to claim 1, wherein the at least one heat sink is integral to at least one wall of the housing.

8. A computer according to claim 1, wherein the computer meets Grade-A of the United States Military's MIL-S-901D specification for shock.

9. A computer according to claim 1, wherein the computer includes a solid-state hard drive.

10. A computer according to claim 1, wherein the computer contains only solid-state components.

11. A computer according to claim 1, wherein at least a portion of the housing includes a conductive material to protect the plurality of computer components from electromagnetic interference.

12. A computer according to claim 1, wherein the computer meets the United States Military's MIL-S-461E specification for electromagnetic interference.

13. A computer according to claim 1, wherein the computer is configured to operate in an exterior environment with a temperature of 60° Celsius.

14. A computer according to claim 1, wherein the computer configured to operate in an exterior environment with humidity ranging between 10% to 90%.

15. A computer according to claim 1, wherein the interior cavity meets the National Electrical Manufacturers Association's standard type 3S for enclosure types.

16. A computer comprising:
a housing including walls that form a substantially sealed interior cavity from an exterior environment;
a plurality of computer components within the interior cavity;
a first means for dissipating thermal energy into the exterior environment through a top wall of the housing, the first means being thermally coupled to at least one computer component and the top wall;
a second means for dissipating thermal energy into the exterior environment through at least one of a front wall, a back wall, and a side wall of the housing, the second means being thermally coupled to the at least one computer component and at least one of a front wall, a back wall, and a side wall of the housing.

17. A computer according to claim 16, wherein the first means includes a thermal pad.

18. A computer according to claim 16, wherein the first means and second means have no moving components.

19. A computer according to claim 16, wherein the computer consumes at least 10 W.

20. A method comprising:
providing a computer including:
a housing including walls that form a substantially sealed interior cavity from an exterior environment;
a plurality of computer components within the interior cavity;
at least one block thermally coupled to at least one computer component and a top wall of the housing to transfer thermal energy from the at least one computer component and the block into the top wall and the exterior environment;
at least one heat sink located on at least one wall of the housing for dissipating thermal energy into the exterior environment; and
at least one pipe thermally coupled to the block and the at least one heat sink to transfer thermal energy from the at least one block and the at least one computer component into the at least one heat sink and the exterior environment; and
operating the computer in an exterior environment with temperatures between 60° and 65° Celsius.

21. A method according to claim 20, further comprising:
operating the computer in an exterior environment with humidity between of 80% and 90%.

22. A method according to claim 20, wherein at least one computer component is thermally coupled to a wall of the housing.

23. A computer comprising:
a housing including walls that form a substantially sealed interior cavity from an exterior environment;
a plurality of computer components within the interior cavity;
at least one block thermally coupled to at least one computer component;
at least one thermal pad thermally coupled to the at least one block and a top wall of the housing to transfer thermal energy from the at least one computer component and the at least one block into the top wall and the exterior environment;
at least one heat sink located on at least one wall of the housing for dissipating thermal energy into the exterior environment; and
at least one pipe thermally coupled to the at least one block and the at least one heat sink to transfer thermal energy from the at least one block and the at least one computer component into the at least one heat sink and the exterior environment.

* * * * *